United States Patent [19]
Yeh

[11] Patent Number: 5,762,208
[45] Date of Patent: Jun. 9, 1998

[54] ADJUSTABLE DISC RACK

[76] Inventor: Morgen Yeh, 2nd Floor, No. 20, Lane 276, Chung Cheng North Road, San Chung City, Taipei Hsien, Taiwan

[21] Appl. No.: 797,056

[22] Filed: Feb. 12, 1997

[51] Int. Cl.⁶ ............................................. A47F 7/00
[52] U.S. Cl. ..................... 211/40; 211/41.12; 211/43; 211/184; D6/407; 312/9.9
[58] Field of Search ........................... 211/41.12, 43, 211/184, 40; 312/9.9; D6/407

[56] References Cited

U.S. PATENT DOCUMENTS

| | | | |
|---|---|---|---|
| 4,162,013 | 7/1979 | Tucker | 211/43 |
| 4,600,110 | 7/1986 | Timor | 211/40 X |
| 5,035,332 | 7/1991 | Stravitz | 211/184 X |
| 5,117,984 | 6/1992 | Kennedy | 211/43 X |
| 5,415,297 | 5/1995 | Klein et al. | 211/43 X |
| 5,474,190 | 12/1995 | Won-Kim | 211/184 X |
| 5,664,691 | 9/1997 | Boivin-Paradis | 211/43 X |

Primary Examiner—Robert W. Gibson, Jr.
Attorney, Agent, or Firm—Morton J. Rosenberg; David I. Klein; Jun Y. Lee

[57] ABSTRACT

An adjustable disc rack including multiple rack units which are slidably and interlacedly serially assembled to form a length-adjustable disc rack or stacked to form a multi-layer disc rack. Each rack unit includes two clamping panels each of which is formed with multiple bottom latch holes and lateral latch holes and multiple connecting levers each of which is formed with two latch sections at two ends latched in the latch holes of the clamping panels so as to secure the clamping panels to two ends of the respective connecting levers. The connecting levers of several rack units can be latched in the bottom latch holes and lateral latch holes of the clamping panels of adjacent rack units, whereby the rack units can be interlacedly and slidably assembled to expand the capacity for containing different classifications of discs.

4 Claims, 8 Drawing Sheets

ADJUSTABLE DISC RACK

BACKGROUND OF THE INVENTION

The present invention relates to an adjustable disc rack including multiple rack units which are slidably and interlacedly serially assembled to form a length-adjustable disc rack or stacked to form a multi-layer disc rack.

Discs for storing digital signals has been widely used in music, video or computer field. Such discs include CD (compact disc), LD (laser disc), compact disc-read only memory (CD-ROM), etc. These discs serve to store digital data without easy damage. In order to securely keep these discs, generally a disc rack with multiple receptacles is used to tidily contain the discs for easy selection. However, the existing disc rack has a fixed dimension and length so that several shortcomings exist in such rack when used as follows:

1. It is impossible to serially assemble several identical disc racks into a longer rack for containing more disc as necessary.

2. It is impossible to freely securely stack the disc racks to expand the capacity thereof.

3. Different discs cannot be stored in different partitions according to their classifications.

SUMMARY OF THE INVENTION

It is therefore a primary object of the present invention to provide an adjustable disc rack including multiple rack units, in which:

1. The rack units are slidably and interlacedly serially assembled to form a length-adjustable disc rack for elastically containing numerous discs.

2. The rack units can be stacked to form a multi-layer disc rack to expand the capacity thereof for storing various classifications of discs.

3. The rack units can be easily and freely assembled by the user himself.

The present invention can be best understood through the following description and accompanying drawings, wherein:

DETAILED DESCRIPTION OF THE PREFERRED EMBODIMENTS

Figure 1:
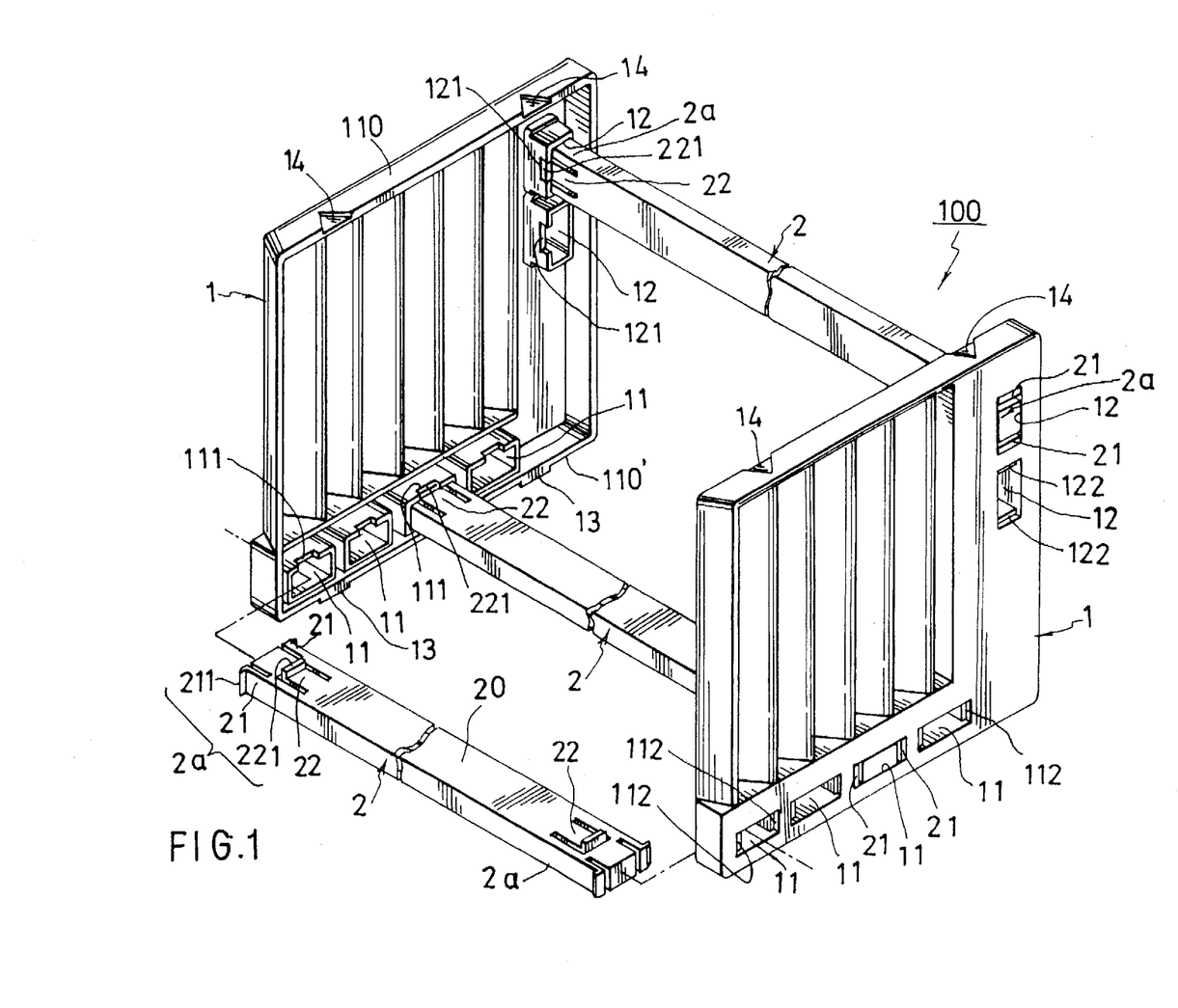
FIG. 1 is a perspective exploded view of the rack unit of the present invention.
Figure 4:
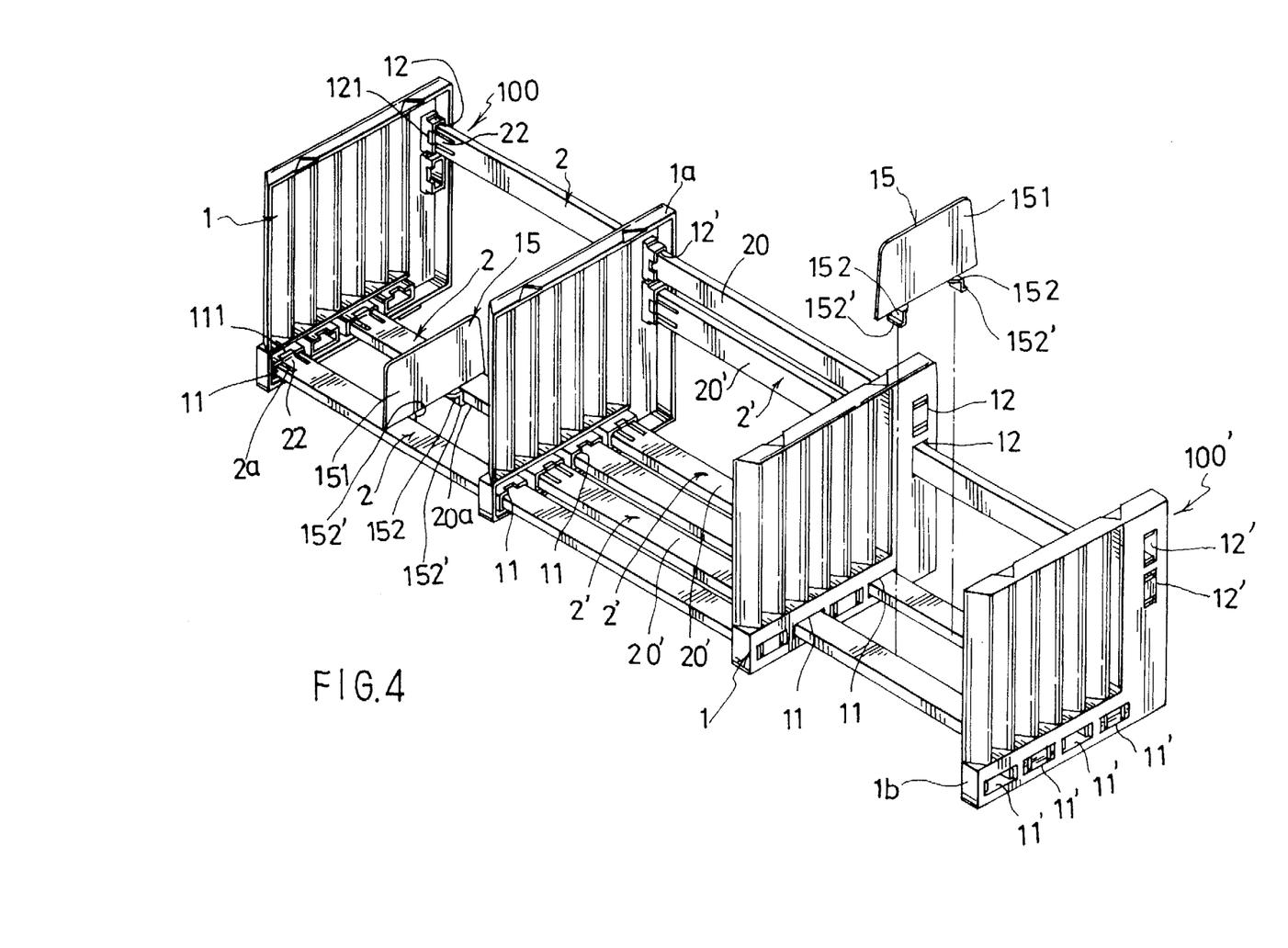
FIG. 4 is a perspective view showing that two rack units are interlacedly and slidably assembled.
Figure 5:
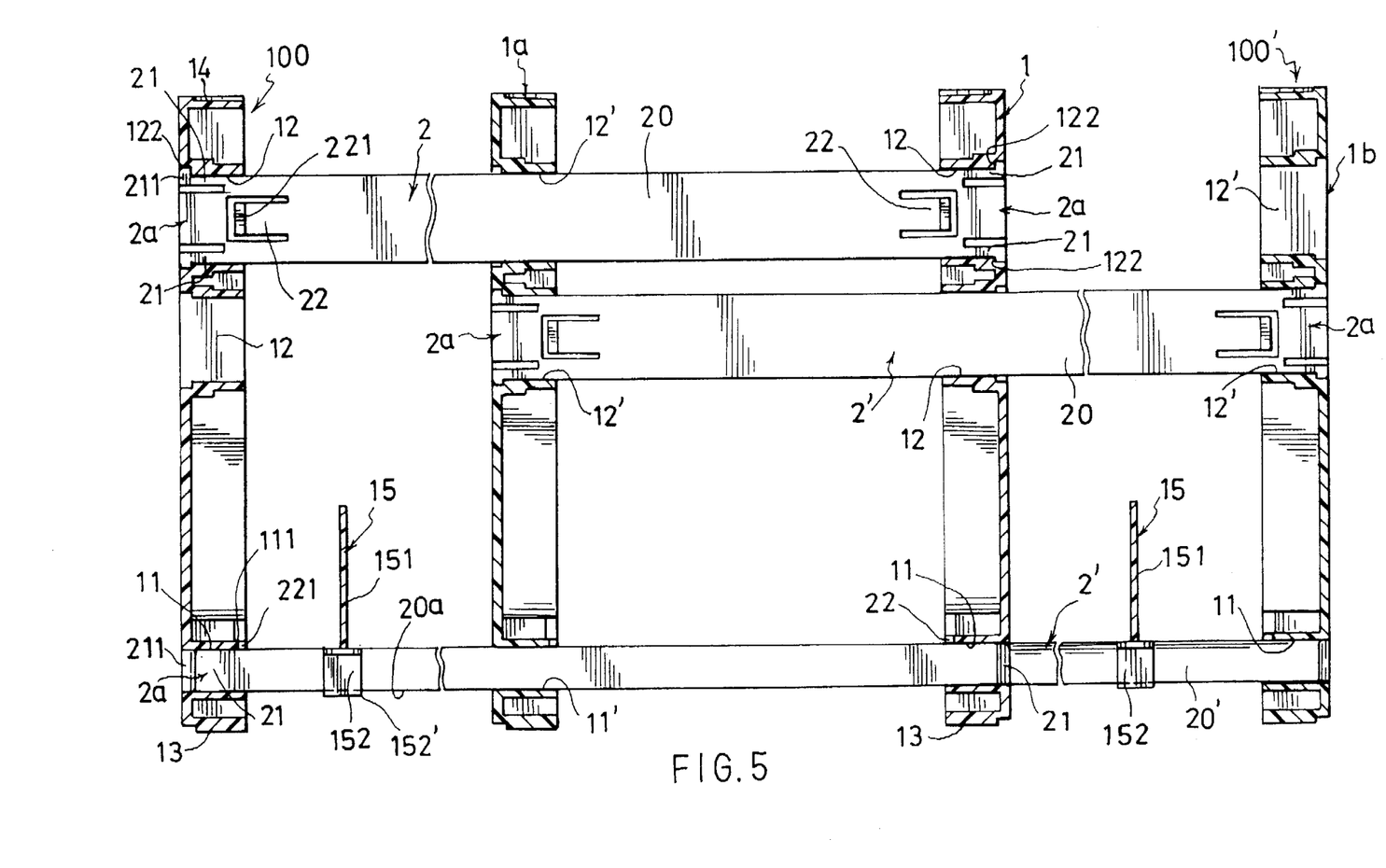
FIG. 5 is a partially sectional view showing that two rack units are interlacedly and slidably assembled.
Figure 9:
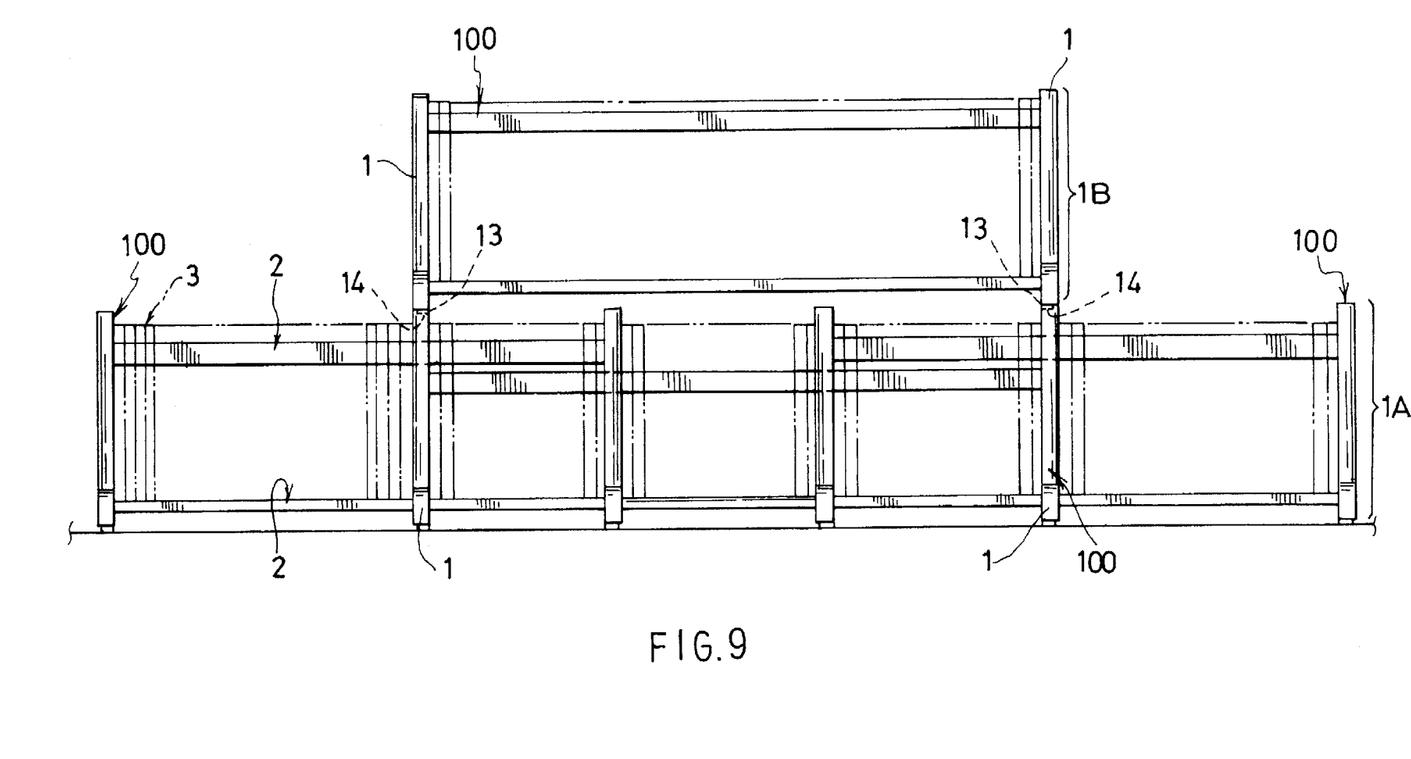
FIG. 9 shows another embodiment of the present invention.

Please refer to FIGS. 1, 4 and 9. The disc rack of the present invention is composed of multiple rack units 100 which are interlacedly and slidably connected or stacked. Each rack unit 100 includes two clamping panels 1 and multiple connecting levers 2. The clamping panels 1 are secured to two ends of the connecting lever 2 to form the rack unit 100.

Figure 2:
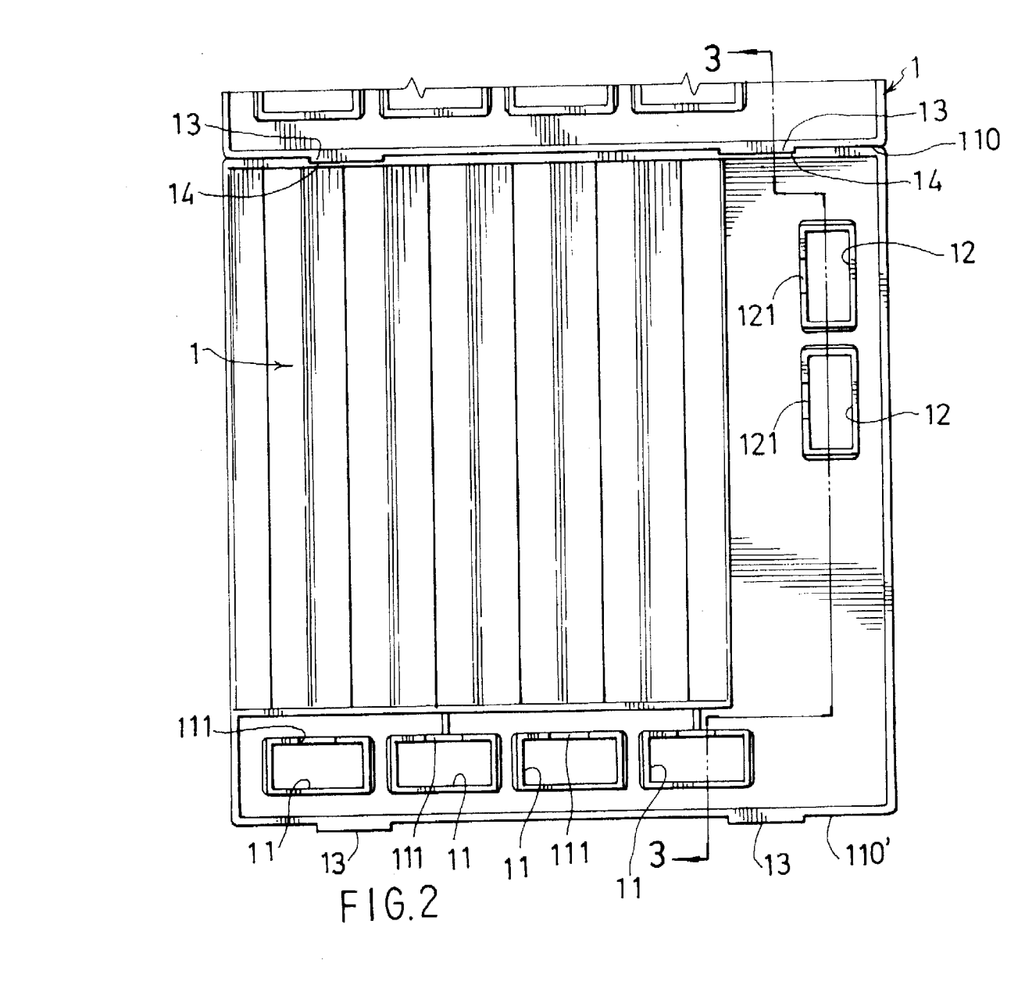
FIG. 2 is a rear view of the clamping panel of the present invention.

Referring to FIGS. 1 and 2, each clamping panel 1 includes: multiple bottom latch holes 11 passing through the bottom end of the clamping panel 1, an inner edge of peripheral wall of each bottom latch hole 11 being formed with at least one stopper notch 111, an outer edge of peripheral wall of each bottom latch hole 11 being formed with at least one latch dent 112; multiple lateral latch holes 12 passing through a lateral side of the clamping panel 1, an inner edge of peripheral wall of each lateral latch hole 12 being formed with at least one stopper notch 121, an outer edge of peripheral wall of each lateral latch hole 12 being formed with at least one latch dent 122; multiple connecting tenons 13 downward projecting from the bottom edge 110' of the clamping panel 1; and multiple connecting mortises 14 formed on the top edge 110 of the clamping panel 1 for engaging with the connecting tenons of an upper clamping panel so as to overlay the upward clamping panel on a lower clamping panel.

Each connecting lever 2 includes an elongated lever body 20 formed with two latch sections 2a respectively at two ends. Each latch section 2a includes: two first resilient latch members 21 resiliently extending from two lateral sides of the latch section 2a and a second resilient latch member 22 resiliently projecting from upper side of the lever body 20. The latch section 2a of the connecting lever 2 is passed through and latched in the bottom latch hole 11 (or the lateral latch hole 12) of the clamping panel 1. At this time, the latch hook 211 of front end of the first resilient latch member 21 is hooked and latched in the latch dent 112 of the bottom latch hole 11 (or the latch dent 122 of the lateral latch hole 12 of the clamping panel 1. Also, the stopper block 221 of front end of the second resilient latch member 22 is stopped and engaged in the stopper notch 111 of the bottom latch hole 11 (or the stopper notch 121 of the lateral latch hole 12 of the clamping panel 1. Therefore, the clamping panel 1 is securely clamped between the latch sections 2a of the connecting lever 2.

Alternatively, the stopper notches 111 and latch dents 112 of the bottom latch hole 11 and the stopper notches 121 and latch dents 122 of the lateral latch hole 12 can be omitted. Accordingly, the bottom latch hole 11 and the lateral latch hole 12 are formed with equal diameter. Therefore, when the latch sections 2a of the connecting lever 2 are latched in the bottom latch holes 11 or lateral latch holes 12, the first and second resilient latch members 21, 22 are respectively engaged with the outer edges of the bottom latch holes 11 or lateral latch holes 12 for tightly clamping the clamping panel 1.

Referring to FIG. 1, when assembled, the latch sections 2a of a connecting lever 2 are latched in at least one pair of opposite bottom latch holes 11 of two clamping panels 1. Also, the latch sections 2a of another connecting lever 2 are latched in at least one pair of opposite lateral latch holes 11 of the two clamping panels 1, whereby the two clamping panels 1 are connected with each other by at least two connecting levers 2 at bottom ends and on lateral sides so as to form the rack unit 100. Accordingly, the discs can be tidily placed on and retained by the connecting levers 2 between the clamping panels 1.

Figure 6:
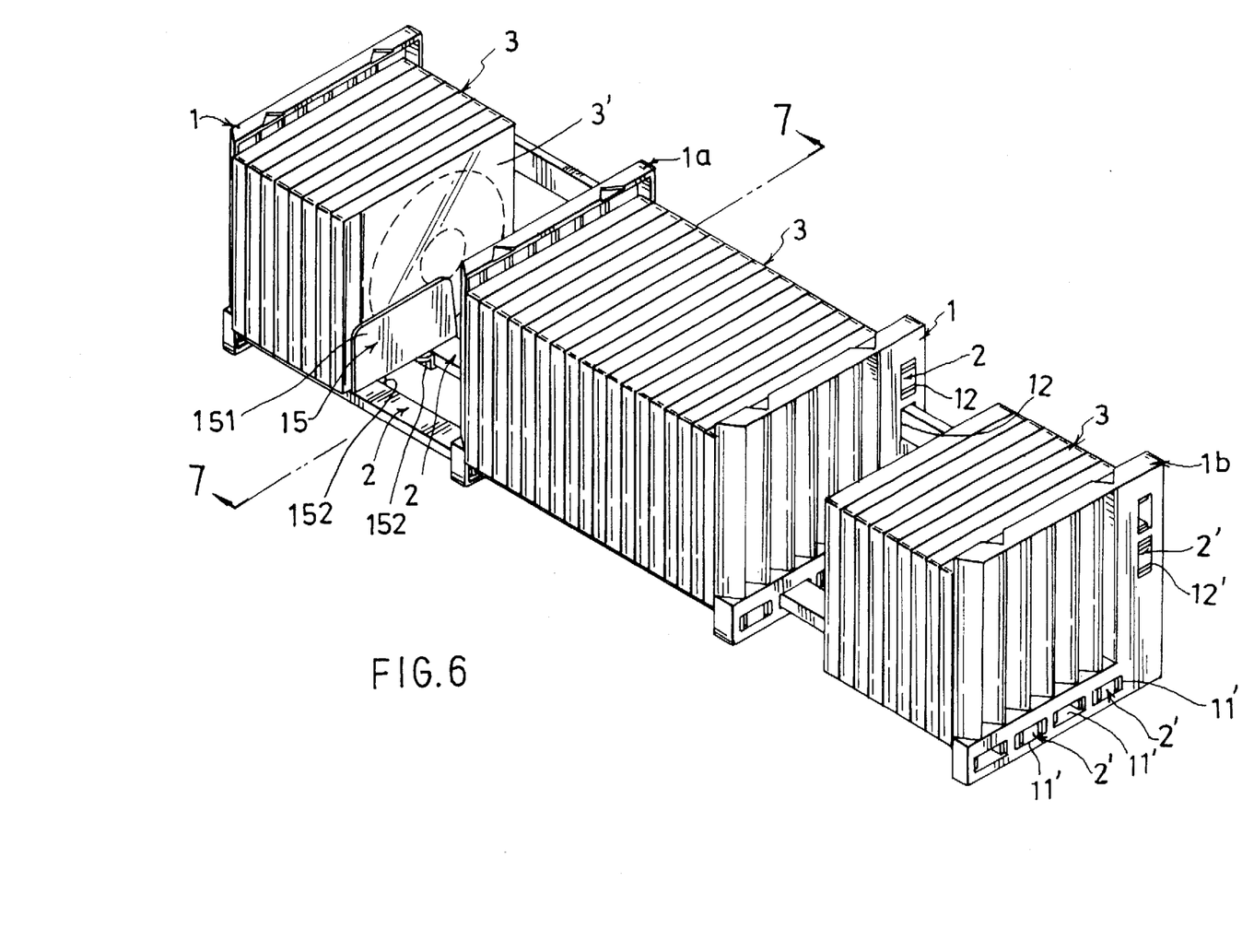
FIG. 6 is a view according to FIG. 4, wherein multiple discs are placed on the disc rack of the present invention.
Figure 7:
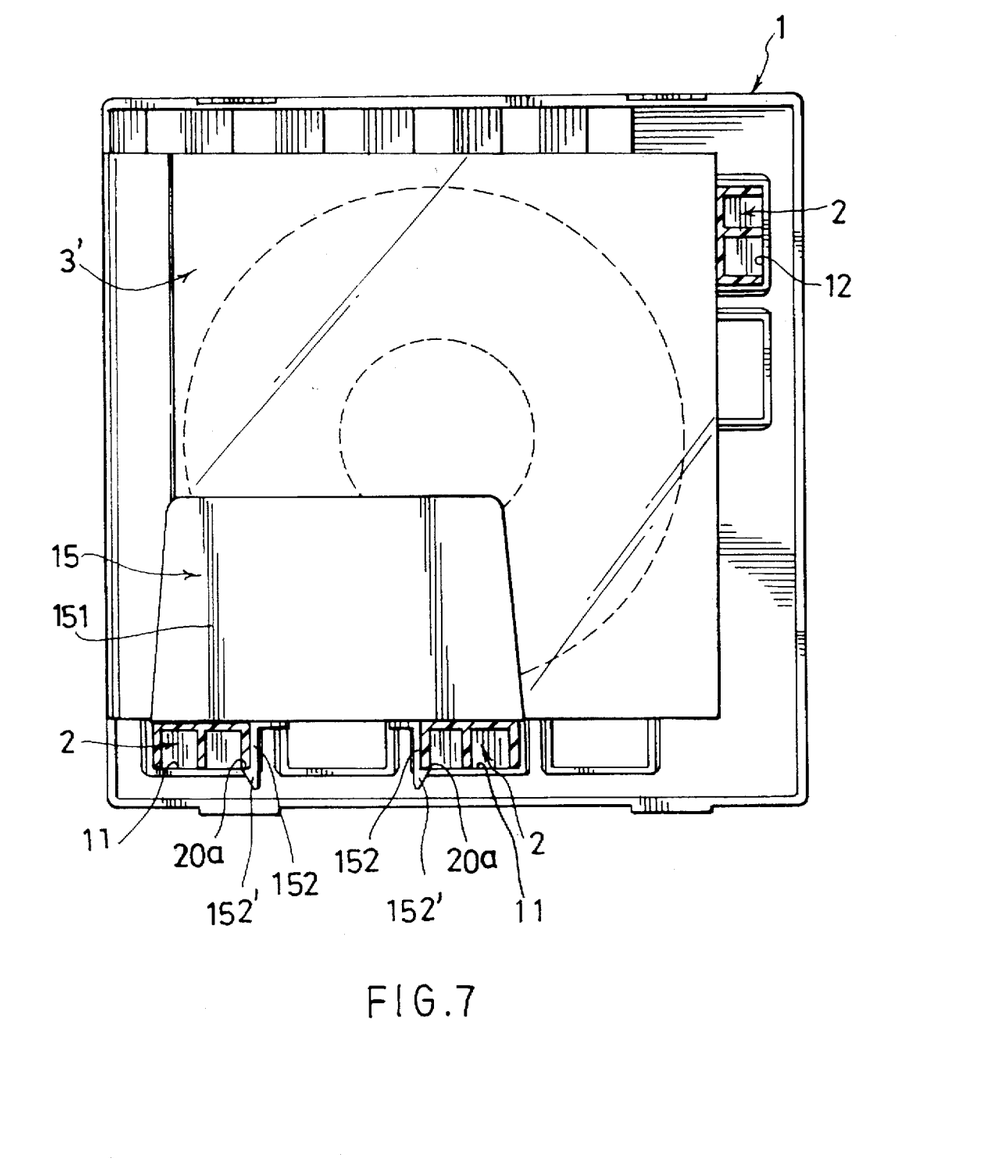
FIG. 7 is a sectional view taken along line 7—7 of FIG. 6.
Figure 8:
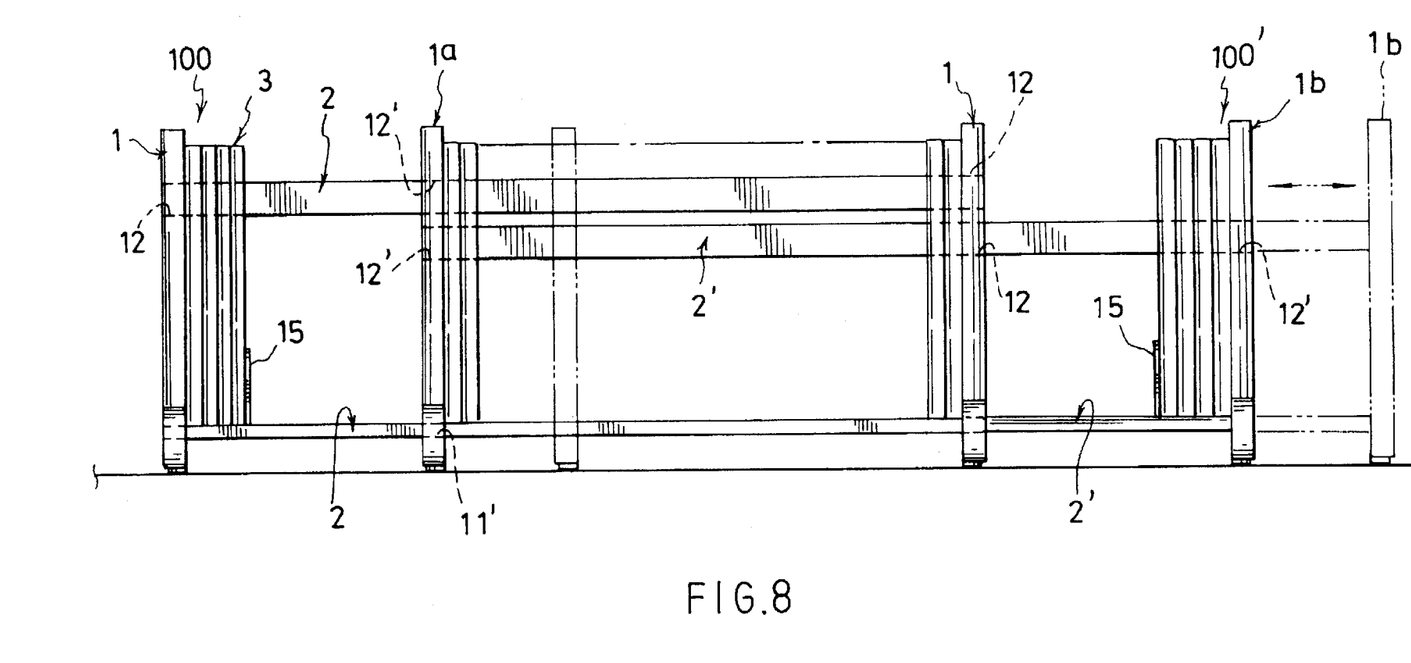
FIG. 8 is a side view showing that the rack units are slided relative to each other to adjust the length of the disc rack.

Referring to FIGS. 4 to 8, when it is desired to interlacedly and slidably connect two rack units, the connecting levers 2 latched in the bottom latch holes 11 and lateral latch holes 12 of two clamping panels 1 of a first rack unit 100 are passed through the corresponding bottom latch holes 11' and lateral latch holes 12' of a first clamping panel 1a of a second rack unit 100', whereby the first clamping panel 1a of the second rack unit 100' can be slided along the connecting levers 2 between the two clamping panels 1 of the first rack unit 100. In addition, the connecting levers 2' latched in the bottom latch holes 11' and lateral latch holes 12' of the first and second clamping panels 1a, 1b of the second rack unit 100' are passed through the corresponding bottom latch holes 11 and lateral latch holes 12 of one clamping panel 1 of the first rack unit 100, whereby the clamping panel 1 of the first rack unit 100 can be slided along the connecting levers 2' between the first and second clamping panels 1a, 1b of the second rack unit 100'. Therefore, the two rack units can be interlacedly and slidably assembled into one rack which is adjustable in length as shown in FIG. 8.

According to the above arrangement, more than two rack units can be serially assembled into a larger rack with expanded capacity for containing increased discs.

As shown in FIG. 4, after two rack units are interlacedly and slidably assembled, each two adjacent clamping panels 1, 1a or 1b define a disc partition for respectively containing different classifications of discs. Therefore, it is easy for a user to select a desired disc.

Figure 3:
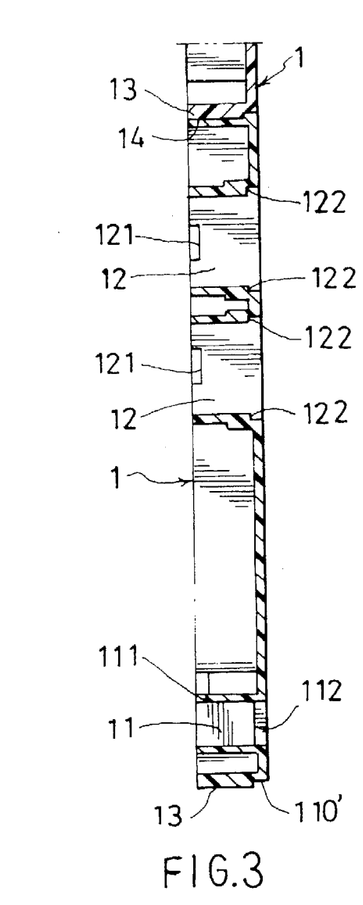
FIG. 3 is a sectional view taken along line 3—3 of FIG. 2.

Referring to FIG. 9, by means of the above measure, several rack units 100 can be assembled into a first layer of rack units 1A. In addition, a second layer of rack units 1B can be connected to the top end of the first layer of rack units 1A. At this time, the connecting tenons 13 of the bottom ends of the respective clamping panels 1 of the second layer of rack units 1B are snugly inserted into the connecting mortises 14 of the top ends of the corresponding clamping panels 1 of the first layer of rack units 1A as shown in FIGS. 2 and 3. Accordingly, the second layer of rack units 1B can be securely disposed above the first layer of rack units 1A for containing more discs.

Referring to FIGS. 4, 6 and 7, a stopper board 15 can be slidably disposed in a bridge pattern on the connecting levers 2 or 2' interconnecting the bottoms of the clamping panels 1. The stopper board 1 serves to stop and prevent the discs placed in the rack unit 100 from falling down. The stopper board 15 includes an upright board section 151 and two guide arms 152 downward extending from the bottom end of the upright board section 151. The free end of each guide arm 152 is disposed with a hook section 152' for hooking the bottom edge 20a of the connecting lever 2, whereby the upright board section 151 of the stopper board 15 can be slided along the connecting levers 2 to stop an outermost disc 3' and prevent the multiple discs from falling down.

In conclusion, according to the requirement of the user, many rack units can be assembled by the user himself into a disc rack with one single layer or multiple layers for containing various discs. Moreover, the number of the serially connected rack units is not limited, so that the capacity for the disc can be adjusted or expanded as necessary.

It is to be understood that the above description and drawings are only used for illustrating some embodiments of the present invention, not intended to limit the scope thereof. Any variation and derivation from the above description and drawings should be included in the scope of the present invention.

What is claimed is:

1. An adjustable disc rack comprising at least one rack unit, said rack unit comprising:
   two clamping panels each having a bottom end, the bottom end being formed with multiple latch holes passing therethrough, a lateral side of each clamping panel being formed with multiple lateral latch holes passing therethrough; and
   multiple connecting levers each being formed with two latch sections respectively at two ends, at least two connecting levers being latched between the bottom latch holes and lateral latch holes of the clamping panels so as to secure the clamping panels to two ends of the respective connecting levers, each latch section of said connecting levers including at least one first resilient latch member and at least one second resilient latch member, the first resilient latch member resiliently extending from a lateral side of the latch section and having a latch hook at a front end, the second resilient latch member resiliently projecting from an upper side of the lever body and having a stopper block at a front end.

2. The adjustable disc rack as claimed in claim 1, wherein a stopper board is slidably disposed on the connecting levers interconnecting the bottom ends of the clamping panels, the stopper board including an upright board section and two guide arms downwardly extending from the bottom end of the upright board section, a free end of each guide arm being disposed with a hook section for hooking the bottom edge of the connecting lever, whereby the upright board section of the stopper board can slide along the connecting levers to stop an outermost disc.

3. The adjustable disc rack as claimed in claim 1, further comprising first and second rack units, the connecting levers latched in the bottom latch holes and lateral latch holes of two clamping panels of said first rack unit are passed through the corresponding bottom latch holes and lateral latch holes of a first clamping panel of said second rack unit, the connecting levers latched in the bottom latch holes and lateral latch holes of the first and second clamping panels of the second rack unit being passed through the corresponding bottom latch holes and lateral latch holes of one clamping panel of the first rack unit, said clamping panel of the first rack unit being positioned between the clamping panels of the second rack unit, whereby the two rack units can be interlacedly and slidably assembled into one rack which is adjustable in length.

4. The adjustable disc rack as claimed in claim 1, further comprising at least three rack units in which the connecting levers are latched in the bottom latch holes and lateral latch holes of the clamping panels of adjacent rack units, whereby the three rack units can be interlacedly and slidably assembled.

* * * * *